United States Patent [19]

Hayakawa

[11] Patent Number: 4,887,518
[45] Date of Patent: Dec. 19, 1989

[54] INTERNAL COMBUSTION ENGINE PISTON WITH THREADED CERAMIC PISTON HEAD

[75] Inventor: Isse Hayakawa, Nagoya, Japan

[73] Assignee: NGK Insulators, Ltd., Nagoya, Japan

[21] Appl. No.: 191,731

[22] Filed: May 2, 1988

Related U.S. Application Data

[63] Continuation of Ser. No. 800,862, Nov. 22, 1985, abandoned.

[30] Foreign Application Priority Data

Dec. 5, 1984 [JP] Japan ................................. 255806

[51] Int. Cl.[4] .......................... F02F 3/00; F02B 23/06; F16J 1/01
[52] U.S. Cl. .......................... 92/212; 92/217; 92/218
[58] Field of Search ................ 92/212–213, 92/216–218, 222, 231, 256, 260; 123/193 P; 411/411, 414, 423, 426, 178, 180; 403/306, 307

[56] References Cited

U.S. PATENT DOCUMENTS

| Re. 17,557 | 1/1930 | Thurston | 403/307 |
|---|---|---|---|
| 1,584,265 | 5/1926 | Williams | 92/212 |
| 2,478,294 | 8/1949 | Madsen | 92/212 |
| 3,027,207 | 3/1962 | Meurer | 123/193 PX |
| 3,189,010 | 6/1965 | Isley | 92/222 X |
| 3,258,284 | 6/1966 | Phipps | 411/411 X |
| 3,495,494 | 2/1970 | Scott | 411/411 |
| 4,189,975 | 2/1980 | Nisida et al. | 411/423 |
| 4,225,981 | 10/1980 | Zeibig | 411/411 X |
| 4,242,948 | 1/1981 | Stang et al. | 123/193 PX |
| 4,245,611 | 1/1980 | Mitchell et al. | 123/193 PX |
| 4,404,935 | 9/1983 | Kraft | 123/193 P |
| 4,419,925 | 12/1983 | Tsuzuki et al. | 92/212 |
| 4,506,593 | 3/1985 | Sugiyama et al. | 92/212 |
| 4,538,562 | 9/1985 | Matsui et al. | 92/212 X |
| 4,552,057 | 11/1985 | Mizuhara | 92/212 X |
| 4,590,901 | 5/1986 | Mizuhara | 92/212 X |
| 4,604,945 | 8/1986 | Mizuhara | 92/212 X |
| 4,667,627 | 5/1987 | Matsui et al. | 92/212 X |

FOREIGN PATENT DOCUMENTS

| 629877 | 4/1936 | Fed. Rep. of Germany . | |
| 969838 | 10/1956 | Fed. Rep. of Germany . | |
| 2736815 | 3/1978 | Fed. Rep. of Germany . | |
| 3134770 | 3/1983 | Fed. Rep. of Germany | 123/193 P |
| 3214093 | 10/1983 | Fed. Rep. of Germany | 92/212 |
| 628423 | 10/1927 | France . | |
| 1177463 | 12/1958 | France | 411/411 |
| 13143 | 1/1983 | Japan | 123/193 P |
| 175749 | 9/1985 | Japan | 123/193 P |
| 175750 | 9/1985 | Japan | 123/193 P |
| 2092709A | 8/1982 | United Kingdom | 123/193 P |

OTHER PUBLICATIONS

Page 571 from *Mechanical Engineering* magazine, Aug., 1932; New York, New York: ASME.

Primary Examiner—Robert E. Garrett
Assistant Examiner—George Kapsalas
Attorney, Agent, or Firm—Arnold, White & Durkee

[57] ABSTRACT

A piston has a piston head made of ceramics, and includes a ceramic piston head having a male rounded thread portion at the outer periphery thereof, a metal piston body having a depression in the top portion for receiving the piston head, and a female rounded thread at the inner periphery of the depression for mating with the male thread portion. A rotation restraint member is provided between the male thread portion and the female thread portion for restraining the piston head from turning with respect to the piston body. The ratio of the height of the thread to the pitch preferably is from ¼ to ½.

16 Claims, 2 Drawing Sheets

INTERNAL COMBUSTION ENGINE PISTON WITH THREADED CERAMIC PISTON HEAD

This is a continuation of application Ser. No. 800,682, filed Nov. 22, 1985, now abandoned.

BACKGROUND OF THE INVENTION

1. Field of the Invention

The present invention relates to a piston with a ceramic piston head, and more specifically the invention relates to a piston with a piston head made of ceramics and having a rounded thread portion at the outer periphery thereof.

2. Description of the Related Art

Heretofore, ceramic sintered bodies having a heat resistance and a low heat conductivity have been used in piston heads of the internal combustion engines to reduce heat loss, improve fuel consumption, reduce the amount of discharge of hydrocarbons, carbon monoxide, etc., and enhance the output during engine operation. For this purpose, there have been various proposals with respect to methods of assembling a piston body of a light alloy as an ordinary material and ceramic piston head together, and the configuration and the structure of ceramic piston heads.

However, since there is a large difference in the coefficient of thermal expansion between the ceramic material used in the ceramic piston head and the light alloy used as the piston body, conventional pistons have the drawback that the fixture between the metal piston body and the ceramic piston head is loosened during the engine operation or a local stress acts upon the ceramic piston head during the reciprocal movement of the piston at a high speed, so that the piston head is likely to be broken due to the brittleness of ceramics. Further, the structure of the ceramic piston head is complicated to assuredly fix the ceramic piston head to the metal piston body, so that there is a practical problem in that the manufacture is difficult due to inherently difficult working of the ceramics.

SUMMARY OF THE INVENTION

It is therefore an object of the present invention to diminish the above drawbacks encountered by the prior art piston with the ceramic piston body.

According to the present invention, there is a provision of a piston with a piston head made of ceramics, which piston comprises a ceramic piston head having a male rounded thread portion at the outer periphery thereof, a metal piston body having a depression in the top portion for receiving the piston head and a female rounded thread portion at the inner periphery of the depression for mating with the male thread portion, and a rotation restraint member provided between the male thread portion and the female thread portion for restraining the piston head from turning with respect to the piston body, wherein the ratio of the height of the thread to the pitch is from 1/5 to 1/1.

According to the piston with the ceramic piston head of the present invention, the ceramic piston head which has at the outer periphery the rounded thread portion in which the ratio of the height of the thread to the pitch is from 1/5 to 1/1 is screwed to the metal piston body, and the piston is provided with a rotation restraint member. The ceramic piston head-assembled piston has an excellent bending strength and durability and can be obtained by screwing the ceramic piston head having the specific rounded thread profile to the metal piston body.

These and other objects, features, and advantages of the invention will be well appreciated upon reading of the following description of the invention when taken in conjunction with the attached drawings with the understanding that some modifications, variations and changes could be easily done by the skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE PREFERRED EMBODIMENTS

According to a piston with a ceramic piston head of the invention, the piston head made of ceramics and having a rounded thread portion is fixed to a metal piston body by screwing. The outer periphery of the ceramic piston head is provided with the rounded thread portion, and the ratio of the height of the thread of the rounded thread portion to the pitch is set within a specific range so that the contact surface between the metal piston body and the ceramic piston head is made larger to render the stress acting upon the thread portion relatively small can easily prevent the fracture of the ceramic piston head due to the concentration of and stress, loosening or peeling-off of the ceramic piston head.

In the following, preferred embodiments according to the present invention will be explained more in detail with reference to the attached drawings, but they are merely illustrative of the invention, and should not be interpreted as limiting the scope of the invention.

Figure 1:
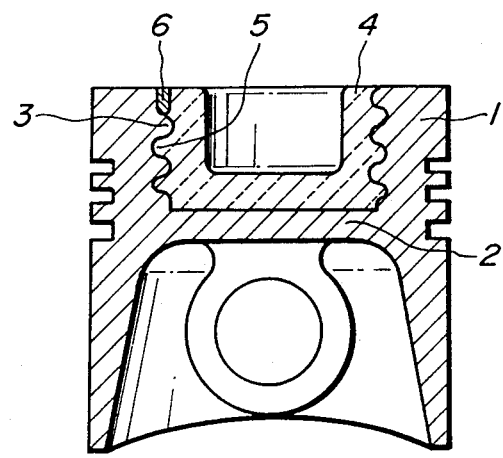
FIGS. 1-4 are sectional views of preferred embodiments of the piston with the ceramic piston head according to the present invention.

FIG. 1 shows the piston with the ceramic piston head as a first embodiment according to the present invention, a ceramic piston head 4 is housed at the top portion of a metal piston body 1 by screwing male rounded threads 5 formed at the outer periphery of the ceramic piston head 4 to female rounded threads 3 formed at a depression 2 provided at the top portion of the metal piston body 1, and the ceramic piston head and the metal piston body are restrained from turning with respect to each other by means of a rotation restraint pin 6 welded at the head portion.

As a material constituting the ceramic piston head, mention may be made of oxides such as $Al_2O_3$, $ArO_2$ and $MgAl_2O_4$, carbides such as SiC, $B_4C$ and TiC, nitride such as $Si_3N_4$, AlN and TiN, oxynitride such as sialon, a composite material such as FRC (fiber reinforced ceramics), cordierite, glass ceramics and so on. Among them, $Si_3N_4$ having excellent heat shock resistance and high temperature strength is preferred as the material constituting the ceramic piston head.

As a method of molding the ceramic piston head used in the present invention, use may be made of a die press method, a slip casting method, an injection molding method and so on. Among them, the slip casting method and the injection molding method are advantageous since they give moldings having profiles near those of final products. The moldings obtained from these molding methods are calcined and roughly machined if necessary, and finally fired, followed by finishing machining.

As to the thread portions applied to the ceramic piston head and the metal piston body, use may be made of such rounded threads that the ratio of the height of the thread to the pitch is from 1/5 to 1/1, preferably from 1/4 to 1/2.

It is preferable that the lead angle of the threads is in a range from 0.5° to 1.5°. The reason is that if the lead angle is larger than 1.5°, the pitch becomes larger so that the stress acting upon the thread portion of the ceramics is likely to be larger, while if it is smaller than 0.5°, the pitch becomes smaller and makes the threading work difficult and could result in collapse of the threads on the metal side during screwing.

The clearance between the male thread and the female thread is desirably as small as possible, and generally it can be made smaller as the surface roughness of the thread portions is smaller. It is better that the larger the difference in the thermal expansion between the ceramics and the metal, the smaller the clearance. Preferably, the clearance is set at not more than 1/10 times as much as the height of the thread.

A machining apparatus such as a screw grinder, a lather, and a centerless grinder with a feed mechanism may be used for threading the thread portion of the ceramic piston head. The metal piston body may be machined according to an ordinary method.

In order to mitigate the influence due to the thermal expansion difference between the ceramic piston head and the metal piston body, they may be fitted together by an expansion fitting method in which the ceramic piston head is cooled with liquid nitrogen as a coolant and then screwed to the metal piston body placed under ordinary temperature, or a shrinkage fitting method in which the heated metal piston body is screwed to the ceramic piston head placed under ordinary temperatures.

The reason why the ratio of the height of the thread of the rounded thread portion to the pitch according to the present invention is restricted to from 1/5 to 1/1 is that when comparison is made with respect to the same length of the pitch, if the ratio is larger than 1/1, stress is more concentrated upon the thread portion of the ceramics so that the thread portion of the ceramics is likely to be broken, while if it is smaller than 1/5, the stress component acting in the detaching direction of the ceramic piston head becomes larger so that the ceramic piston head is likely to be detached due to the reciprocal movement of the piston.

As an example, a piston head made of silicon nitride and having an outer diameter of 65 mm with the ratio of the height of the thread to the pitch and a lead angle shown in Table 1 was screwed to an aluminum piston body having an outer diameter of 100 mm as in a manner as shown in FIG. 1. The ceramic piston head-mounted piston in which a rotation restraint pin had been welded was assembled into a diesel engine, which was subjected to a 100 hour durability test at a number of revolutions shown in Table 1. Consequently, as shown in Table 1, no abnormality was observed at revolutions of not lower than 2,200 rpm with respect to Sample Nos. 2–10 according to the present invention in which the ratio between the height of the thread and the pitch is in a range from 1/1 to 1/5. On the other hand, in Sample Nos. 1 and 11 outside of the present invention in which the ratio between the height of the thread and the pitch is 2/1 and 1/7 respectively, fracture and slacking of the piston head after the test were observed at a number of revolution of not more than 2,000.

TABLE 1

| Piston No. | Ratio of thread height to pitch | Lead angle | Number of revolution (rpm) | Breakage | Slacking of piston head |
| --- | --- | --- | --- | --- | --- |
| 1 | 2/1 | 2.2° | 2,000 | occurred | — |
| 2 | 1/1 | 1.0° | 2,400 | no | no |
| 3 | 1/2 | 0.8° | 2,800 | no | no |
| 4 | 1/3 | 2.0° | 2,200 | no | no |
| 5 | 1/3 | 1.5° | 3,000 | no | no |
| 6 | 1/3 | 1.0° | 3,600 | no | no |
| 7 | 1/3 | 0.5° | 13,100 | no | no |
| 8 | 1/3 | 0.4° | 2,300 | no | no |
| 9 | 1/4 | 1.0° | 2,700 | no | no |
| 10 | 1/5 | 0.8° | 2,300 | no | no |
| 11 | 1/7 | 0.7° | 1,800 | no | occurred |

Figure 2:
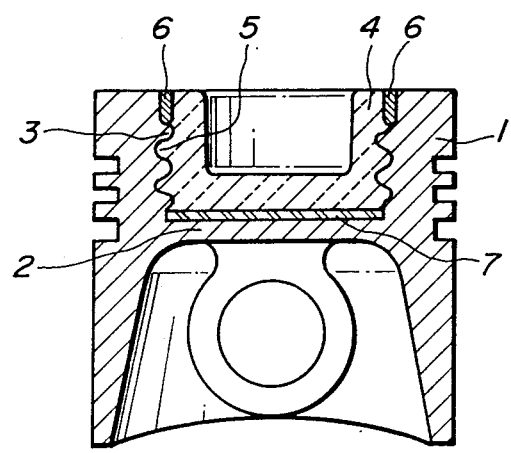

FIG. 2 shows a second embodiment according to the present invention. In this embodiment, a ceramic piston head 4 is screwed to a metal piston body 1 through a buffer member 7 provided on a depression 2 of the metal piston body 1. The material of the buffer member 7 may be preferably a material having a heat resistance and a high elasticity. For instance, mention may be preferably made of carbon fiber, ceramic fiber such as alumina fiber and asbestos fiber, metal spring, washer, and a metal sheet. By the provision of the buffer member 7, a nonuniform gap between the bottom portion of the ceramic piston head 4 and the metal piston body 1 can be extremely reduced to prevent the slacking and permit the firm fixing, while the large difference in thermal expansion between the ceramic piston head 4 and the metal piston body 1 is mitigated. Therefore, fracture due to the stress concentration, and the slacking and slipping-off of the ceramic piston head can be mitigated.

Figure 3:
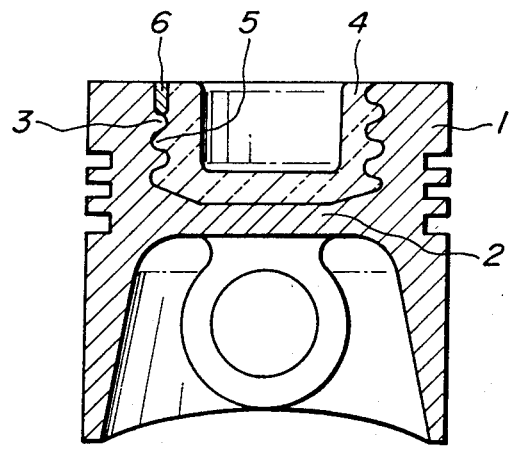

FIG. 3 shows a third embodiment according to the present invention. In this embodiment, the profile of the bottom portion of the ceramic piston head 4 is designed in a frusto-conical shape combining a taper surface with a plane surface.

Although the plane profiles as shown in the first and second embodiments are preferred in respect of the manufacturing feasibility, the effects aimed at by the present invention can also be obtained with respect to the piston having the frusto-conical bottom surface piston head. Besides the frusto-conical shape bottom, various bottom profiles such as a spherical shape, or a cylindrical shape may be employed in the present invention.

Figure 4:
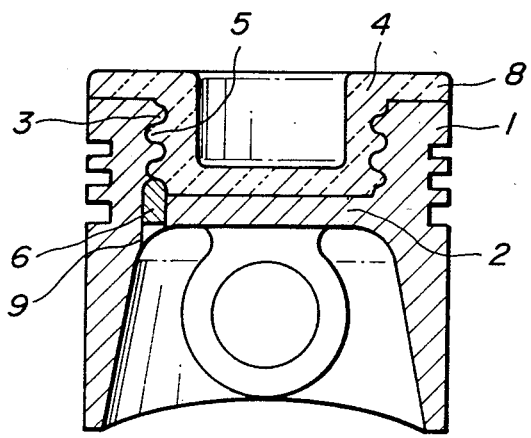

FIG. 4 shows a fourth embodiment according to the present invention. In this embodiment, a ceramic piston head 4 is provided with a flange portion 8 at the upper portion for covering the upper whole surface of the piston body with the ceramic piston head 4. A rotation restraint pin 6 is inserted from the bottom of the piston body through a hole 9 formed in the piston body 1 and secured to the piston body 1 through welding.

In this embodiment, in addition to the effects of preventing the fracture, slacking and slipping-off of the ceramic piston head, the heat resistance of the piston can be favorably enhanced since the entire upper whole surface of the piston is covered with ceramics.

As mentioned above, according to the piston with the ceramic piston head of the present invention, since the ceramic piston head and the metal piston body are secured to each other through the rounded threads having a peculiar profile, the ceramic piston head can be prevented from slipping off from the metal piston body during operation, and further stress can be prevented from locally acting upon the ceramic piston head. Thus, the present invention is extremely useful as the piston for internal combustion engines.

What is claimed is:

1. A piston comprising:
   a ceramic piston head having a continuous male thread portion formed on substantially an entire outer peripheral portion of the ceramic piston head, said thread portion consisting of rounded threads having a substantially uniform radius of curvature;
   a metal piston body including an inner peripheral portion which forms a depression in a top portion of the metal piston body, said depression having a sufficient volume to encompass the entire ceramic piston head, said inner peripheral portion including a continuous female thread portion for mating with the male thread portion said female thread portion consisting of rounded threads having a substantially uniform radius of curvature; and
   a rotation restraining means for restraining the piston head from rotatably turning with respect to the piston body, wherein a ratio of the height of the male and female thread portions to the pitch thereof is from ¼ to ½.

2. The piston of claim 1, wherein a heat resistant and elastic buffer member is located between a bottom portion of the ceramic piston head and the depression in the metal piston body, said buffer member preventing backlash between the ceramic piston head and metal piston body, said buffer member comprising a material selected from the group consisting of carbon fibers, ceramic fibers and asbestos fibers.

3. The piston of claim 2, wherein a bottom portion of the ceramic piston head is flat.

4. The piston of claim 1, wherein a bottom portion of the ceramic head is flat.

5. The piston of claim 1, wherein the rotation restraining means is welded to the metal piston body at a top portion of the metal piston body, said rotation restraining means being provided at an interface of the ceramic piston head and metal piston body.

6. The piston of claim 1, wherein a lead portion of the male and female threads is from 0.5° to 1.5°.

7. The piston of claim 1, wherein a clearance between the rounded male thread and the rounded female thread is not greater than 1/10 times the height of the threads.

8. A piston comprising:
   a cup-shaped substantially cylindrical ceramic piston head having a top portion, a bottom portion and an outer peripheral portion, said outer peripheral portion including a continuous male thread portion formed on substantially the entirety thereof, said male thread portion consisting of rounded threads having a substantially uniform radius of curvature;
   a metal piston body including a top portion and a cavity portion, said cavity portion extending inward from said top portion and having an inner peripheral surface and a bottom surface, said inner peripheral surface including a continuous female thread portion therein for mating with the rounded male thread portion said female thread portion consisting of rounded threads having a substantially uniform radius of curvature; and
   a rotation restraining means for restraining the piston head from rotatably turning with respect to the piston body, wherein a ratio of the height of the male and female thread portions to the pitch thereof is from ¼ to ½.

9. The piston of claim 8, wherein a heat resistant and elastic buffer member is located between the bottom portion of the ceramic piston head and the bottom surface of the metal piston body, said buffer member preventing backlash between the ceramic piston head and the metal piston body, said buffer member comprising a material selected from the group consisting of carbon fibers, ceramic fibers and asbestos fibers.

10. The piston of claim 9, wherein the bottom portion of the ceramic piston head is flat.

11. The piston of claim 8, wherein the bottom portion of the ceramic piston head is flat.

12. The piston of claim 8, wherein the rotation restraining means is welded to the metal piston body at the top portion of the metal piston body, said rotation restraining means being provided at an interface of the ceramic piston head and metal piston body.

13. The piston of claim 8, wherein a lead portion of the male and female threads is from 0.5° to 1.5°.

14. The piston of claim 8, wherein a clearance between the rounded male thread and the rounded female thread is not greater than 1/10 times the height of the threads.

15. A piston comprising:
   a ceramic piston head having a continuous male thread portion at an outer peripheral portion of the ceramic piston head, said thread portion consisting of rounded threads;
   a metal piston body including an inner peripheral portion which forms a depression in a top portion of the metal piston body, and a continuous female rounded thread portion located in said inner peripheral portion for mating with the male thread portion, wherein a ratio of the height of the male and female thread portions to the pitch thereof is from ¼ to ½ said male and female thread portions comprising rounded threads having a substantially uniform radius of curvature;
   a rotation restraining means for restraining the piston head from rotatably turning with respect to the piston body, said rotation restraining means being provided at an interface of the ceramic piston head and metal piston body; and
   an elastic buffer member located between a bottom portion of the ceramic piston head and the depression in the metal piston body, said buffer member preventing backlash between the ceramic piston head and metal piston body, said buffer member comprising a material selected from the group consisting of carbon fibers, ceramic fibers and asbestos fibers.

16. The piston of claim 15, wherein the elastic buffer member is heat resistant.

* * * * *